United States Patent Office 2,960,502
Patented Nov. 15, 1960

2,960,502

**6-SUBSTITUTED COMPOUNDS OF THE PREG-
NANE SERIES AND A PROCESS FOR THE PRO-
DUCTION AND USE THEREOF**

Frank H. Lincoln, Kalamazoo, and Alan H. Nathan and
William P. Schneider, Kalamazoo Township, Kalama-
zoo County, Mich., assignors to The Upjohn Company,
Kalamazoo, Mich., a corporation of Delaware No Drawing. Filed June 4, 1959, Ser. No. 818,015

20 Claims. (Cl. 260—239.55)

This invention relates to a novel process for the pro-
duction of intermediates useful in the production of 6-
substituted hydrocortisone, 6-substituted prednisolone
and their esters, and to cerain 5α-hydroxy-6β-substituted
compounds.

The process of this invention provides a means of pro-
ducing 6-substituted hydrocortisone and 6-substituted
prednisolone in increased yield from that obtained by
other alternate processes employing a common starting
compound. This increased yield is obtained even though
the claimed process involves more steps. At the same
time, the claimed process provides useful novel com-
pounds.

The process of this invention employs a mono-ketal of
polyketo steroid described hereinafter. This novel com-
pound is the product of a selective ketalization of the
corresponding polyketo steroid and is obtained in sur-
prisingly high yield under conditions which would be ex-
pected to produce a polyketalized steroid.

The claimed process and the compounds produced
therein can be represented by the following formulae:

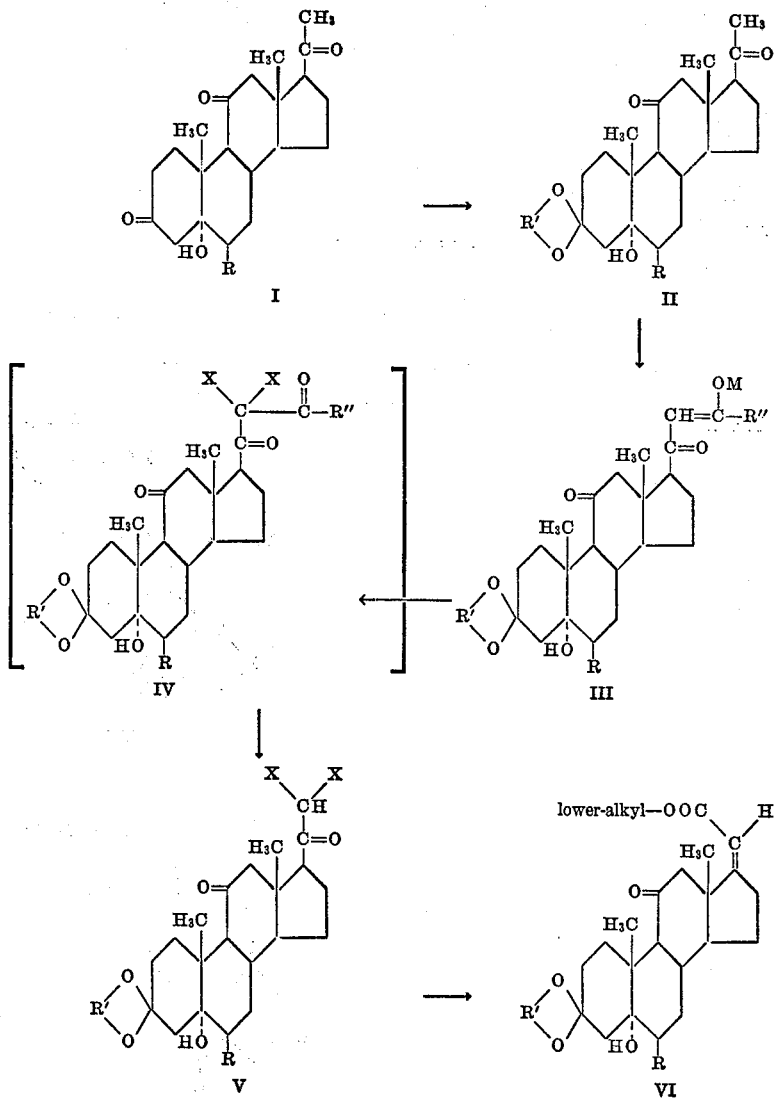

In the above formulae R is fluorine or lower-alkyl; R' is lower-alkylene containing from 2 to 3 carbon atoms in the chain; R'' is hydrogen, carbo-lower-alkoxy or trifluoromethyl; M is hydrogen or an alkali-metal; and X is chlorine or bromine. In the above formulae and hereinafter, lower-alkyl, lower-alkylene and lower-alkoxy means containing from 1 to 8 carbon atoms, inclusive.

According to this invention, a 3-ketalized 5α-hydroxy-6β-substituted-pregnane-3,11,20-trione (II) is subjected to the following sequence of reactions, either with or without isolation of the intermediately produced products: First, the compound is condensed with an active ester, e.g., a lower-alkyl oxalate, a lower-alkyl formate, or a lower-alkyl trifluoroacetate, in the presence of a base condensation catalyst, to produce the corresponding 21-carbonyl compound (III). This compound is then dihalogenated with chlorine or bromine, in the presence of sufficient base to react with the hydrogen halide formed, to produce the corresponding 21,21-dihalo compound (V). This dihalo compound is then reacted with an alkali-metal lower-alkoxide in a lower-alkanol to produce a 3-ketalized 3,11-diketo-5α-hydroxy-6-substituted - 17-(20)-[cis]-pregnen-21-oic acid lower-alkyl ester (VI).

A preferred embodiment of this invention involves preparing the 3-ketalized 5α-hydroxy-6-substituted-pregnane-3,11,20-trione (II) by selectively ketalizing a 5α-hydroxy-6β-substituted-pregnane-3,11,20-trione (I), e.g., by reaction with a lower-alkylene-α-glycol, a lower-alkylene-β-glycol, i.e., a lower-alkylene glycol having from 2 to 3 carbon atoms connecting the hydroxy groups, or the corresponding dioxolanes produced by the reaction of these compounds with a lower-alkyl ketone, e.g., acetone or methyl ethyl ketone, in the presence of an acid catalyst. Selectivity is conveniently achieved by reaction with the ketalizing agent preferably at about room temperature, i.e., about 20 to about 30° C., although temperatures from about 10 to 40° C. are also operable. Higher temperatures reduce selectivity and lower temperatures reduce reactivity.

The starting compounds for this ketalization (I) wherein R is lower-alkyl other than methyl are prepared according to the procedure of Spero et al., J. Am. Chem. Soc., 78, 6813 (1956), i.e., by substituting a molar equivalent amount of the selected lower-alkyl Grignard reagent, e.g., ethyl magnesium bromide, propyl magnesium bromide, etc., for the methyl magnesium bromide employed therein.

The condensation, halogenation and rearrangement steps to convert a compound represented by Formula II into a compound represented by Formula VI can be conducted according to procedures known in the art.

The condensation step employs a lower-alkyl ester of oxalic acid, formic acid or trifluoroacetic acid, preferably at least a molar equivalent and preferably the methyl or ethyl ester; a base condensation catalyst, preferably about a molar equivalent of, e.g., alkali-metal lower-alkoxides, preferably sodium methoxide, sodium ethoxide or potassium tertiary butoxide, an alkali-metal, e.g., sodium, or an alkali-metalamide, e.g., sodium amide; and a 3-cyclic ketal of 5α-hydroxy-6β-lower-alkylpregnane-3,11,20-trione or a 3-cyclic ketal of 5α-hydroxy-6β-fluoropregnane-3,11,20-trione (II), preferably the 3-ethylene glycol ketal, 3-trimethylene glycol ketal or the 3-(2',2'-dimethylpropanediol) ketal. A wide range of temperatures, reaction times and inert solvents can be employed, e.g., 0–100° C., 5 minutes to 48 hours, tertiary butyl alcohol, benzene, toluene, ether, and mixtures thereof.

In the halogenation step, sufficient base, e.g., potassium acetate, sodium acetate, sodium propionate is added to react with all of the hydrogen halide produced in the reaction. Conveniently, sufficient organic acid, e.g., glacial acetic acid is added to convert the alkali-metal enolate (III, M=alkali-metal) produced in the condensation step into the free enol (III, M=H). About two molar equivalents of bromine or chlorine per mole of starting steroid is employed. When bromine is used, the end point can be determined by the persistence of the bromine color. The halogenation is ordinarily conducted at below room temperature, e.g., about −10 to 10° C. The halogenation reaction product (V) can be isolated or employed directly in situ in the rearrangement step.

The rearrangement step employs an alkali-metal lower-alkoxide in a lower-alkanol, e.g., sodium methoxide in methanol or sodium ethoxide in ethanol. It is preferred if the lower-alkyl groups of the alkanol and alkali-metal lower-alkoxide in the reaction mixture are the same so as to prevent the formation of mixed esters of VI.

The 3 - ketalized - 3,11 - diketo - 5α - hydroxy - 6β-substituted - 17(20) - [cis] - pregnen - 21 - oic acid lower-alky ester (VI) can be converted to compounds having glucocorticoid and anti-inflammatory activity by reactions represented by the following formulae:

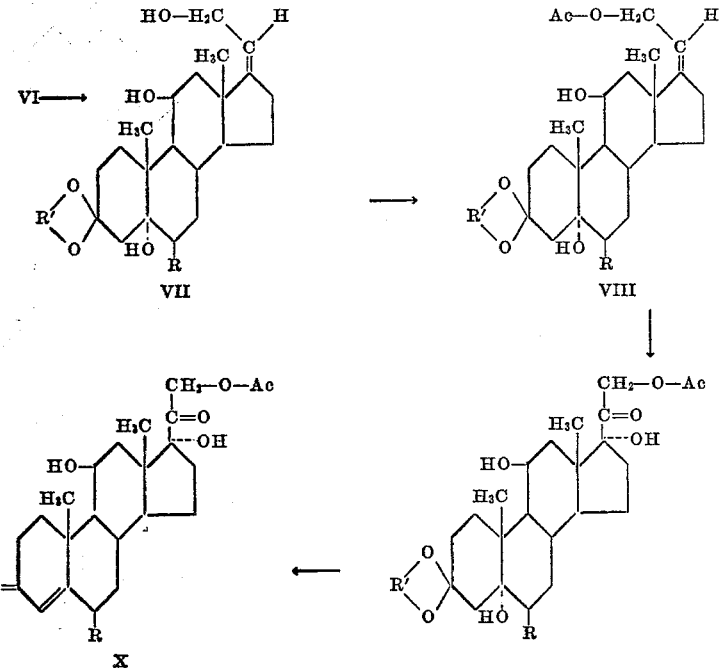

wherein R and R' have the values given hereinbefore, and Ac is the acyl radical of a hydrocarbon carboxylic acid containing from 1 to 12 carbon atoms.

The 11-keto and 21-carbonyloxy groups of a compound represented by Formula VI are reduced with lithium aluminum hydride to produce the corresponding 3-ketal of 5α,11β,21-trihydroxy-6β-substituted - 17(20)-pregnen-3-one (VII). The 21-hydroxy group of the thus-produced compound is then esterified, e.g., to produce a 21-hydrocarbon carboxylic acid ester thereof containing from 1 to 12 carbon atoms, inclusive (VIII), and this ester is then oxidatively hydroxylated, e.g., with osmium tetroxide and hydrogen peroxide, an amine oxide peroxide, or aryl iodo oxide, to produce the corresponding 3-ketal of 5α,11β,17α,21-tetrahydroxy-6β-substituted-pregnane-3,20-dione (IX). The ketal group is then removed to regenerate the 3-keto group and the 5α-hydroxy group dehydrated, preferably simultaneously, e.g., with hydrogen chloride in methylene chloride containing methanol or ethanol, to produce a 21-ester of a 6-substituted hydrocortisone (X).

6α-lower-alkyl-hydrocortisone, 6α - fluoro - hydrocortisone and 21-esters thereof (X) possess glucocorticoid and anti-inflammatory activity and are thus useful as pharmacological substitutes for hydrocortisone and hydrocortisone acetate. The novel process of this invention and certain intermediates employed in the production of these hormones provide useful means of producing these valuable hormones.

The following examples are illustrative of the products and process of this invention but are not to be construed as limiting.

EXAMPLE 1

*3-ethylenedioxy-5α-hydroxy-6β-methylpregnane-11,20-dione*

50 g. of 5α-hydroxy-6β-methylpregnane-3,11,20-trione [Spero et al., J. Am. Chem. Soc., 78, 6813 (1956)], 43 g. of ethylene glycol and 0.5 g. of p-toluenesulfonic acid monohydrate was mixed with 500 ml. of methylene chloride and the mixture was stirred for about 16 hours. The reaction mixture was washed with two 250-ml. portions of saturated aqueous sodium bicarbonate and two 250-ml. portions of water. The methylene chloride was evaporated and the solid residue slurried in 500 ml. of refluxing cyclohexane. The hot solution was filtered, the filtrate concentrated to about 500 ml. and then maintained at room temperature for three hours. The precipitated 3-ethylene-dioxy-5α - hydroxy - 6β - methylpregnane-11,20-dione was filtered and dried to give 36.8 g., M.P. 127–130° C., $[\alpha]_D+56°$ (CHCl$_3$). A further 11.2 g. of the same product, M.P. 129–132° C., was obtained by concentrating the second filtrate to 450 ml. and maintaining overnight at room temperature.

Following the above procedure, but substituting other 5α-hydroxy-6β-lower-alkylpregnane-3,11,20 - trione, e.g., wherein the lower-alkyl group is ethyl, propyl, isopropyl butyl, octyl, etc., there is thus produced the corresponding 3-ethylene glycol ketal thereof.

Similarly, substituting 5α-hydroxy-6β-fluoropregnane-3,11,20-trione (U.S. Patent 2,838,501) as the starting compound, there is thus produced 3-ethylenedioxy-5α-hydroxy-6β-fluoropregnane-11,20-dione.

EXAMPLE 2

*3-(2',2'-dimethyl-trimethylenedioxy)-5α-hydroxy-6β-methylpregnane-11,20-dione*

A mixture of 13.0 g. of 2,2-dimethyl-1,3-propanediol, 9.0 g. of 5α-hydroxy-6β-methylpregnane-3,11,20-trione and 87.5 mg. of p-toluenesulfonic acid monohydrate in 87.5 ml. of methylene chloride was stirred for about 16 hours at room temperature in a closed vessel. The mixture was then washed with five 100-ml. portions of 2% aqueous sodium bicarbonate, dried and evaporated to dryness. The residue was dissolved in 55 ml. of acetone, filtered, diluted with cyclohexane, refiltered and the second filtrate concentrated to give 4.6 g. of 3-(2',2'-dimethyl-trimethylene-dioxy)-5α-hydroxy - 6β - methylpregnane-11,20-dione, M.P. 174–177° C., $[\alpha]_D+50°$ (CHCl$_3$). Another 4.6 g. of the same product, M.P. 160–170° C., was obtained as a second crop.

Following the above procedure, but substituting other 5α - hydroxy - 6β - lower - alkylpregnane - 3,11,20 - trione, e.g,. wherein the lower-alkyl group is ethyl, propyl, isopropyl, butyl, octyl, etc., there is thus produced the corresponding 3-(2',2'-dimethyl-propanediol) ketal thereof.

Similarly, substituting 5α-hydroxy-6β-fluoropregnane-3,11,20-trione as the starting compound, there is thus produced 3-(2',2'-dimethyl-trimethylenedioxy)-5α-hydroxy-6β-fluoropregnane-11,20-dione.

EXAMPLE 3

*3 - ethylenedioxy - 5α - hydroxy - 6β - methyl - 21,21 - dibromopregnane-11,20-dione*

To a solution of 50 g. of 3-ethylenedioxy-5α-hydroxy-6β-methylpregnane-11,20-dione in 600 ml. of tertiary butyl alcohol at 30° C. under a nitrogen atmosphere was added 51 ml. of ethyl oxalate followed by 54.2 g. of 25% methanolic sodium methoxide. The mixture containing the 3-ethylenedioxy-5α-hydroxy-6β-methyl-21-ethoxyoxalyl-pregnane-11,20-dione sodium enolate was stirred for 20 minutes and to it was then added 14.3 ml. of acetic acid to give the free enol followed by an ice cold solution of 41 g. of sodium acetate in 800 ml. of methanol. After stirring for five minutes, the solution was cooled to 0° C. and to it was added over a 15-minute period an ice cold solution of 38.5 g. of bromine in 385 ml. of methanol. The mixture was stirred for another 20 minutes with cooling and then filtered and the cake washed with 75 ml. of cold methanol and then with water. The precipitate was dried at room temperature to give 60.9 g. of 3-ethylenedioxy - 5α - hydroxy - 6β - methyl - 21,21 - dibromopregnane-11,20-dione having a variable melting point, e.g., 129–131° C. (dec.), $[\alpha]_D+48°$ (CHCl$_3$), after crystallization from a mixture of methylene chloride and methanol.

EXAMPLE 4

*3 - ethylenedioxy - 5α - hydroxy - 6β - methyl - 11 - keto-17(20)-[cis]-pregnen-21-oic acid methyl ester*

A solution of 2.00 g. of crystalline 3-ethylenedioxy-5α-hydroxy-6β-methyl-21,21-dibromopregnane-11,20-dione in 15 ml. of methylene chloride was diluted with 10 ml. of methanol and cooled to +5° C. With stirring and continued cooling 1.46 g. of 26.3% w./w. solution of sodium methoxide in methanol was added. After 5 minutes the cooling bath was removed and stirring was continued for 1.5 hours. 0.2 ml. of acetic acid was added and the reaction mixture evaporated to dryness at reduced pressure from a 40° bath. The residue was extracted with benzene, and the extract chromatographed on 100 g. of magnesium silicate (Florisil). The column was developed with 200-ml. portions of solvent of the following composition and order: 10 of hexanes (Skellysolve B) plus 3% acetone, 5 of hexanes plus 5% acetone and 3 of hexanes plus 8% acetone. The third through ninth hexanes plus 3% acetone eluate fractions were combined and crystallized from 5 ml. of methanol to give 1.05 g. of 3 - ethylenedioxy - 5α - hydroxy - 6β - methyl - 11 - keto-17(20)-[cis]-pregnen-21-oic acid methyl ester, M.P. 122–124° C. An analytical sample melted at 124–125° C., $[\alpha]_D-11°$ (CHCl$_3$).

EXAMPLE 5

*3 - ethylenedioxy - 5α - hydroxy - 6β - methyl - 11 - keto-17(20)-[cis]-pregnen-21-oic acid methyl ester*

A solution of 4.04 g. of 3-ethylenedioxy-5α-hydroxy-6β-methylpregnane-11,20-dione in 50 ml. of t-butyl alcohol was warmed in a nitrogen atmosphere to 35° and treated while stirring with 4.1 ml. of ethyl oxalate and then 4.1 g. of a 26.3% solution of sodium methoxide in methanol. A pale-yellow precipitate soon separated. After 20 minutes, an ice cold solution of 3.5 g. of sodium acetate in 60 ml. of methanol was added. When all of the insoluble material had dissolved, the mixture was cooled to 0° and an ice cold solution of 3.6 g. of bromine in 33 ml. of methanol was added dropwise over a 10 minute period. After all of the bromine was added, the mixture was stirred for 5 minutes longer, then treated with 9.22 g. of a solution of 26.3% w./w. sodium methoxide in methanol. The mixture was warmed to room temperature and stirred for 2 hours. The crude product was recovered by dilution of the reaction mixture with ice-water and filtration. The cake was washed with water and air-dried. There was obtained 4.13 g. of 3-ethylenedioxy-5α-hydroxy-6β-methyl-11-keto-17(20)-[cis]-pregnen-21-oic acid methyl ester melting at 66–74° C. Crystallization from methanol yielded 2.09 g. (48.4%) of heavy prisms melting at 118–121° C.

EXAMPLE 6

*3 - (2',2' - dimethyl - trimethylenedioxy) - 5α - hydroxy-6β - methyl - 11 - keto - 17(20) - [cis] - pregnen - 21-oic methyl ester*

To a solution of 8.93 g. of 3-(2',2'-dimethyl-trimethylenedioxy)-5α-hydroxy-5β-methylpregnane-11,20-dione in 100 ml. of tertiary butyl alcohol was added, under a nitrogen atmosphere at 55° C., 8.75 g. of ethyl oxalate followed, one minute later, by 8.64 g. of 25% methanolic sodium methoxide as rapidly as possible. The mixture was permitted to cool to room temperature while stirring for 45 minutes. To the resulting solution containing 3-(2',2' - dimethyl - trimetylenedioxy) - 5α - hydroxy - 6β-methyl - 21 -ethoxyoxalyl - pregnane - 11,20 - dione sodium enolate was added 2.4 g. of glacial acetic acid to produce the free enol followed by 3.28 g. of anhydrous sodium acetate in 160 ml. of methanol. The mixture was cooled to about 0° C. and to it was added dropwise an ice cold solution of 6.4 g. of bromine in 64 ml. of methanol. Then 23.3 g. of 25% methanolic sodium methoxide was added and the mixture was stirred for 20 to 24 hours at room temperature. The mixture was then chilled to about 0° C. and stirred at this temperature for about 2 hours, filtered and the precipitate washed with 10 ml. of cold methanol followed by water. The thus-obtained 3-(2',2' - dimethyl - trimethylenedioxy) - 5α - hydroxy - 6β-methyl - 11 - keto - 17(20) - [cis] - pregnen - 21 - oic acid methyl ester was dried in a vacuum at between 50–60° C. to give 6.84 g. of crystals melting at 202–208° C. Recrystallization from ethyl acetate gave crystals melting at 219.5–220° C., $[\alpha]_D$ -9° (CHCl$_3$).

Following the procedure of Example 6, but substituting other 3 - (2',2' - dimethyl - trimethylenedioxy) - 5α - hydroxy-6β-lower-alkylpregnane-11,20-dione, e.g., wherein the lower-alkyl group is ethyl, propyl, isopropyl, butyl, octyl, etc., there is thus produced the corresponding 3-(2',2' - dimethyl - propanediol) - 5α - hydroxy - 6β - lower - alkyl - 11 - keto - 17(20) - [cis] - pregnen - 21-oic acid methyl ester.

Similarly, substituting 3-(2',2'-dimethyl-trimethylenedioxy)-5α-hydroxy-6β-fluoropregnane-11,20-dione as the starting compound, there is thus produced 3-(2',2'-dimethyl-trimethylenedioxy)-5α-hydroxy-6β-fluoro-11-keto-17(20)-[cis]-pregnen-21-oic acid methyl ester.

EXAMPLE 7

*3-ethylenedioxy-5α,11β,21-trihydroxy-6β-methyl-17(20)-[cis]-pregnene*

To a solution of 3.00 g. of 3-ethylenedioxy-5α-hydroxy-6β-methyl-21,21-dibromopregnane-11,20-dione in 30 ml. of benzene and 5 ml. of methanol at 5° C. under a nitrogen atmosphere was added 2.19 g. of 25% methanolic sodium methoxide. The mixture was stirred at 5–10° C. for 30 minutes, warmed to 25° C. and then stirred for another 15 minutes. To the mixture was then added 0.1 ml. of acetic acid to neutralize the solution. The mixture was then filtered and the cake washed with 10 ml. of benzene.

The filtrate containing the thus-produced 3-ethylenedioxy - 5α - hydroxy - 6β - methyl - 11 - keto - 17(20)-[cis]-pregnen-21-oic acid methyl ester was concentrated to about one-half volume and then cautiously added to a mixture of 0.90 g. of lithium aluminum hydride in 50 ml. of anhydrous ether under nitrogen. The mixture was then refluxed for 1.5 hours, cooled and cautiously decomposed with 15 ml. of ethyl acetate followed by 50 ml. of water. The organic layer was separated, and the aqueous layer washed with two 5-ml. portions of ether. The combined organic layers were dried and evaporated to dryness. The residual 3-ethylenedioxy-5α,11β,21-trihydroxy-6β-methyl-17(20)-[cis]-pregnene was dissolved in 10 ml. of acetone which was diluted with 25 ml. of cyclohexane and the mixture then slowly concentrated until crystallization commenced. The mixture was cooled to room temperature and, after 2 hours, filtered and the precipitate washed with a mixture of cyclohexane and acetone. The thus-obtained product was dried to give 1.39 g. of crystals melting at 147–150° C. An additional 0.2 g. of product melting at 145–149° C. was obtained by concentrating the filtrate and crystallizing the precipitate from a mixture of acetone and hexanes. Further crystallization raises the melting point of 155–156° C., $[\alpha]_D$ 0° (CHCl$_3$).

Following the above procedure, but substituting other 3 - ethylenedioxy - 5α - hydroxy - 6β - lower - alkyl-21,21-dibromo-pregnane-11,20-dione, e.g., wherein the lower-alkyl group is ethyl, propyl, isopropyl, butyl, octyl, etc., there is thus produced the corresponding 3-ethylenedioxy - 5α,11β,21 - trihydroxy - 6 - lower - alkyl - 17(20)-[cis]-pregnene.

Similarly, substituting 3-ethylenedioxy-5α-hydroxy-6β-fluoro-21,21-dibromopregnane-11,20-dione as the starting compound, there is thus produced 3-ethylenedioxy-5α-hydroxy - 6β - fluoro - 11 - keto - 17(20) - [cis] - pregnen-21-oic acid methyl ester which is converted without isolation to 3-ethylene-dioxy-5α,11β,21-trihydroxy-6β-fluoro-17(20)-pregnene.

Substituting other alkali-metal alkoxides in other alkaools for the sodium methoxide in methanol, e.g., sodium ethoxide in ethanol, sodium propoxide in propanol, etc., there is thus produced the corresponding lower-alkyl ester of 3 - ethylenedioxy - 5α - hydroxy - 6β - methyl - 11-keto-17(20)-[cis]-pregnen-21-oic acid which is also converted to 3-ethylenedioxy-5α,11β,21-trihydroxy-6β-methyl-17(20)-[cis]-pregnene.

EXAMPLE 8

*3-(2',2'-dimethyl-trimethylenedioxy)-5α,11β,21-trihydroxy-6β-methyl-17(20)-[cis]-pregnene*

A solution of 9.6 g. of 3-(2',2'-dimethyl-trimethylenedroxy) - 5α - hydroxy - 6β - methyl - 11 - keto - 17(20)-[cis]-pregnen-21-oic acid methyl ester in a mixture of 120 ml. of anhydrous benzene and 190 ml. of anhydrous ether was added to a mixture of 3.2 g. of lithium aluminum hydride and 190 ml. of ether. The resulting mixture was stirred for 1.5 hours and then decomposed with 12.5 ml. of ethyl acetate followed by 40 ml. of water. The organic layer was decanted and the inorganic solids were extracted twice with 50-ml. portions of ether. The combined organic layers were washed twice with 200-ml. portions of water, dried and evaporated to dryness.

The residuel 8.81 g. of 3-(2',2'-dimethyl-trimethylenedioxy - 5α,11β,21 - trihydroxy - 6β - methyl - 17(20)-[cis]-pregnene was dissolved in 90 ml. of ethyl acetate which was then concentrated to 50 ml. and refrigerated overnight. There was obtained 6.89 g. of crystals melting at 190–194° C., $[\alpha]_D$ —9° (CHCl$_3$). A sample recrystallized twice from acetone melted at 193–194° C. and had an $[\alpha]_D$ of —11° (CHCl$_3$).

Substituting 3-(2',2'-dimethyl-trimethylenedioxy-5α-hydroxy-6β-fluoro-11-keto-17(20)-[cis]-pregnen-21-oic acid methyl ester as the starting steroid in the above-described reaction is productive of 3-(2',2'-dimethyl-trimethylenedioxy) - 5α,11β,21 - trihydroxy - 6α - fluoro - 17(20)-[cis]-pregnene.

EXAMPLE 9

*3-ethylenedioxy-5α,11β,21-trihydroxy-6β-methyl-17(20)-[cis]-pregnene 21-acetate*

A mixture of 1.59 g. of 3-ethylenedioxy-5α,11β,21-trihydroxy-6β-methyl-17(20)-[cis]-pregnene, 5 ml. of pyridine and 5 ml. of acetic anhydride was maintained at room temperature for about 16 hours and then poured into 50 ml. of a mixture of ice and water and stirred for one hour. The crystalline precipitate was separated, washed with water and dried to give 1.8 g. of 3-ethylenedioxy - 5α,11β,21 - trihydroxy - 6β - methyl - 17(20)-[cis]-pregnene 21 acetate melting at 142–151° C. Recrystallization from a mixture of acetone and hexanes gave plates melting at 152–153° C., $[\alpha]_D$ 0° ($CHCl_3$).

Following the above procedure, but substituting other 3 - ethylenedioxy - 5α,11β,21 - trihydroxy - 6β - lower-alkyl-17(20)-[cis]-pregnene, e.g., wherein the lower-alkyl group is ethyl, propyl, isopropyl, butyl, octyl, etc., there is thus produced the corresponding 21-acetate thereof.

Similarly, substituting 3-ethylenedioxy-5α,11β,21-trihydroxy-6β-fluoro-17(20)-[cis]-pregnene as the starting compound, there is thus produced 3-ethylenedioxy-5α,11β,21 - trihydroxy - 6β - fluoro - 17(20) - [cis] - pregnene 21-acetate.

Similarly, 3 - ethylenedioxy - 5α,11β,21 - trihydroxy-6β - methyl - 17(20) - pregnene and 3 - ethylenedioxy-5α,11β,21-trihydroxy-6β-fluoro-17(20)-pregnene are converted to other 21-acrylates thereof by esterification of the 21-hydroxy group, e.g., by reaction with the appropriate acid anhydride, acid chloride or bromide, ester by ester exchange, acid in the presence of an esterification catalyst, etc. Examples of these esters thus prepared include those wherein the acyl radical of the ester group is that of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,6- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts), e.g., succinic, glutaric, α-methylglutaric, β-methylglutaric, β,β-dimethylglutaric, adipic, pimelic, suberic, etc., acid.

EXAMPLE 10

*3 - (2',2' - dimethyl - trimethylenedioxy)-5α,11β,21-trihydroxy-6β-methyl-17(20)-[cis]-pregnene-21-acetate*

To a solution of 28.1 g. of 3-(2',2'-dimethyl-trimethylenedioxy)-5α,11β,21-trihydroxy-6β-methyl-17(20)-[cis]-pregnene in 100 ml. of pyridine was added 70 ml. of acetic anhydride and the mixture was maintained at room temperature overnight. 500 ml. of water was then added and the mixture extracted with two 200-ml. portions of methylene chloride which were then washed with four 100-ml. portions of water. The aqueous layer and washes were each washed with 50 ml. of methylene chloride. The combined methylene chloride extracts were distilled to dryness at reduced pressure to give 30.7 g. of 3-(2',2'-dimethyl-trimethylenedioxy)-5α,11β,21-trihydroxy-6β-methyl-17(20)-[cis]-pregnene 21-acetate melting at 136–141° C., $[\alpha]_D$ −3° ($CHCl_3$). An analytical sample melted at 140–141° C., $[\alpha]_D$ −5° ($CHCl_3$).

Similarly, substituting 3-(2',2'-dimethyl-trimethylenedioxy)-5α,11β,21-trihydroxy-6β-fluoro-17(20)-[cis]-pregnene as the starting compound, there is thus produced 3 - (2',2' - dimethyltrimethylenedioxy) - 5α,11β,21 - trihydroxy-6β-fluoro-17(20)-[cis]-pregnene 21-acetate.

Similarly, the above two starting compounds are converted to other 21-acylates thereof by esterification of the 21-hydroxy group, e.g., by reaction with the appropriate acid anhydride, acid chloride or bromide, ester by ester exchange, acid in the presence of an esterification catalyst, etc. Examples of these esters thus prepared include those wherein the acyl group is the acyl radical of an acid named in the paragraph following Example 9.

EXAMPLE 11

*3-ethylenedioxy-5α,11β,17α,21-tetrahydroxy-6β - methylpregnan-20-one 21-acetate*

To a solution of 1.8 g. of 3-ethylenedioxy-5α,11β,21-trihydroxy-6β-methyl-17(20)-[cis]-pregnene 21-acetate in 50 ml. of tertiary butyl alcohol was added successively, at room temperature, 0.8 ml. of pyridine, 6 ml. of N-methylmorpholine oxide peroxide in tertiary butyl alcohol, titrating 40.5 ml. of 0.1 N sodium thiosulfate per ml., and 5 mg. of osmium tetroxide. The mixture was stirred overnight at room temperature, mixed with 25 ml. of 0.5% sodium hyposulfite and then concentrated to about one-half volume at reduced pressure. The product was extracted with 50 ml. of methylene chloride which was washed with water, the water being back extracted with more methylene chloride. The combined extracts were dried and evaporated at reduced pressure to dryness. The residue was dissolved in about 15 ml. of ethyl acetate and filtered through filter aid which was then washed with 5 ml. of ethyl acetate. The filtrates were concentrated to about 10 ml. and diluted with 20 ml. of hexanes. The product was refrigerated for one hour, filtered and the precipitate washed with a mixture of cold ethyl acetate and hexanes. The 3-ethylenedioxy-5α,11β,17α,21-tetrahydroxy-6β-methylpregnane-20-one 21-acetate was obtained in three crops, the first melting at 191–192° C., $[\alpha]_D$ +33° ($CHCl_3$).

Following the above procedure, but substituting other 3-ethylenedioxy-5α,11β,21-trihydroxy - 6β - lower-alkyl-17(20)-[cis]-pregnene 21-acetate, e.g., wherein the lower-alkyl group is ethyl, propyl, isopropyl, butyl, octyl, etc., there is thus produced the corresponding 3-ethylenedioxy-5α,11β,17α,21-tetrahydroxy-6β-lower alkylpregnan-20-one 21-acetate.

Similarly, substituting 3-ethylenedioxy-5α,11β,21-trihydroxy-6β-fluoro-17(20)-[cis]-pregnene 21-acetate as the starting compound, there is thus produced 3-ethylenedioxy-5α,11β,17α,21-tetrahydroxy-6β - fluoropregnan - 20-one 21-acetate.

Other 21-acylates of the above-named compounds, e.g., wherein the acyl radical of the 21-acylate group is that of an acid named in the paragraph following Example 9, are produced by substituting the corresponding 21-acylates instead of the above 21-acetates as starting compounds.

EXAMPLE 12

*3 -(2',2',-dimethyl-trimethylenedioxy)- 5α,11β,17α,21-tetrahydroxy-6β-methylpregnan-20-one 21-acetate*

To a solution of 15 g. of 3-(2'2'-dimethyl-trimethylenedioxy) - 5α,11β,21-trihydroxy-6β-methyl-17(20)-[cis]-pregnene 21-acetate in 273 ml. of tertiary butyl alcohol was added successively, at room temperature, 3.9 ml. of pyridine, 2.75 molar equivalents of N-methylmorpholine oxide peroxide in tertiary butyl alcohol and 17.8 mg. of osmium tetroxide in 5.0 ml. of tertiary butyl alcohol. After the mixture was maintained overnight at room temperature, 6.3 g. of filter aid (Magnesol) and 0.48 g. of sodium hydrosulfite in 96 ml. of water was added and the mixture stirred for 30 minutes. The mixture was filtered and the cake washed with two 50-ml. portions of methylene chloride. The filtrate was concentrated to about 90 ml. at reduced pressure and then mixed with 600 ml. of water which was then extracted four times with 300-ml. portions of methylene chloride. The organic layer was washed with two 300-ml. portions of water and then concentrated to dryness at reduced pressure. The residual 3-(2',2'-dimethyl-trimethylenedioxy)-5α,11β,17α,21-tetrahydroxy-6β-methylpregnan-20-one 21-actate was dissolved with warming in 25 ml. of ethyl acetate which was then allowed to cool. The precipitate was filtered to give crystals in three crops, the first melting at 236–240° C., the second at 222–225° C., and the third at 214–219° C. An analytical sample melted at 224–225° C., $[\alpha]_D +40°$ (ethanol).

Similarly, substituting 3-(2',2'-dimethyl-trimethylenedioxy) - 5α,11β,21-trihydroxy-6β-fluoro-17(20) [cis]-pregnene-21-acetate as the starting steroid, there is thus produced 3 - (2',2' - dimethyl-trimethylenedioxy) - 5α, 11β, 17α,21-tetrahydroxy-6β-fluoropregnan-20-one 21-acetate,

*6α - methyl-11β,17α,21-trihydroxy-4-pregnene-3,20-dione 21-acetate*

Into a solution of 1.0 g. of 3-ethylenedioxy-5α,11β,17α,21-tetrahydroxy-6β-methylpregnan-20-one 21-acetate in 25 ml. of chloroform and 0.5 ml. of absolute ethanol was bubbled gaseous hydrogen chloride for one hour at between —5 and 0° C. The solution was then washed with cold aqueous sodium bicarbonate until the solution was neutral. The methylene chloride layer was separated and the aqueous layer washed with about 15 ml. of methylene chloride. The combined organic layers were washed with water, dried and evaporated to dryness at reduced pressure. The residual 6α-methyl-11β,17α,21-trihydroxy-4-pregnene-3,20-dione 21-acetate was crystallized from a mixture of 10 ml. of acetone and 10 ml. of hexanes. There was obtained 0.60 g. of crystals melting at 201–204° C., $[\alpha]_D +141°$ (CHCl$_3$).

Following the above procedure, but substituting other 3 - ethylenedioxy - 5α,11β,17α,21 - tetrahydroxy - 6β-lower-alkyl-pregnan-20-one 21-acetate, e.g., wherein the lower-alkyl group is ethyl, propyl, isopropl, butyl, octyl, etc., there is thus produced the corresponding 6α-lower-alkyl - 11β,17α,21 - trihydroxy - 4 - pregnene - 3,20-dione 21-acetate.

Similarly, substituting 3-ethylenedioxy-5α,11β,17α,21-tetrahydroxy - 6β - fluoropregnan - 20 - one 21 - acetate as the starting compound, there is thus produced 6α-fluoro - 11β,17α,21 - trihydroxy - 4 - pregnene - 3,20-dione 21-acetate.

Substituting the 3-(2',2'-dimethylpropanediol) ketal of the above-described compounds for the 3-ethylene glycol ketal thereof as the starting compound in the above described reaction is productive of the same steroid reaction products.

We claim:

1. A process which comprises the steps of (1) selectively ketalizing 5α-hydroxy-6β-R-pregnane-3,11,20-trione wherein R is selected from the group consisting of lower-alkyl and fluorine, with a compound selected from the group consisting of a lower-alkylene-α-glycol and a lower-alkylene-β-glycol in the presence of an acid catalyst to produce a compound represented by the formula:

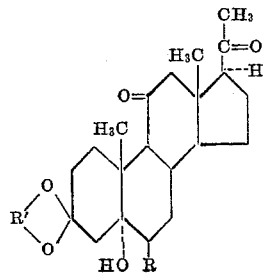

wherein R has the value given hereinbefore and R' is lower-alkylene containing from 2 to 3 carbon atoms in the chain, (2) condensing the thus-produced compound with an ester selected from the group consisting of lower-alkyl oxalate, lower-alkyl formate, and lower-alkyl trifluoroacetate, in the presence of a base condensation catalyst, to produce a 21-carbonyl substituted compound; (3) halogenating the thus-produced compound with about 2 molar equivalents of a halogen having an atomic weight from 35 to 80, inclusive, in the presence of sufficient base to react with the hydrogen halide formed; and (4) reacting the thus-produced compound with an alkali-metal lower-alkoxide in the presence of an alkanol to produce a compound represented by the formula:

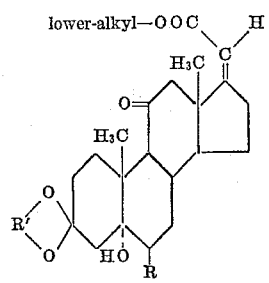

wherein R and R' have the values given hereinbefore.

2. The process of claim 1 wherein the ester is a lower-alkyl oxalate, the base condensation catalyst is an alkali-metal lower-alkoxide and the halogen is bromine.

3. The process of claim 1 wherein R is methyl, the ester is a lower-alkyl oxalate, the base condensation catalyst is sodium lower-alkoxide, the halogen is bromine, the alkali-metal lower-alkoxide is sodium lower-alkoxide, and the lower-alkyl groups in every instance contain from 1 to 2 carbon atoms.

4. The process of claim 1 wherein R is methyl, the ketalizing compound is 2',2'-dimethyl trimethylene, the ester is diethyl oxalate, the base condensation catalyst is sodium methoxide, the halogen is bromine, the base is an alkali-metal acetate, the alkali-metal lower-alkoxide is sodium methoxide, and the lower-alkanol is methanol.

5. The process of claim 1 wherein R is methyl, the starting compound is ketalized with 2,2-dimethyl-1,3-propane diol in the presence of p-toluenesulfonic acid for several hours at about room temperature, the ester is lower-alkyl oxalate, the base condensation catalyst is sodium lower-alkoxide, the halogen is bromine, the base is an alkali-metal acetate, the alkali-metal lower-alkoxide is sodium lower-alkoxide, the lower-alkyl groups in every instance containing from 1 to 2 carbon atoms.

6. The process which comprises the steps of (1) ketalizing 5α - hydroxy - 6β - methylpregnane - 3,11,20-trione with 2,2-dimethyl-1,3-propanediol in the presence of p-toluenesulfonic acid for several hours at about room temperature, (2) condensing the thus-produced 3-(2',2'-dimethyl-trimethylenedioxy) - 5α - hydroxy - 6β - methylpregnane-11,20-dione with ethyl oxalate in the presence of sodium methoxide, (3) brominating the free enol of the thus-produced sodium enolate of 3-(2',2'-dimethyl-trimethylenedioxy) - 5α - hydroxy - 6β - methyl - 21 - ethoxyoxalyl - 5α - hydroxy - 6β - methyl - 21 - ethoxyoxalylpregnane-11,20-dione with about two molar equivalents of bromine, in the presence of sufficient alkali-metal acetate to react with all the hydrogen bromide produced, (4) rearranging the thus-produced 3-(2',2'-dimethyl-trimethylenedioxy) - 5α - hydroxy - 6β - methyl - 21,21-dibromo - 21 - ethoxyoxalyl - pregnane - 11,20 - dione with sodium methoxide and methanol to produce 3-(2',2' - dimethyl - trimethylenedioxy) - 5α - hydroxy-6β - methyl - 11 - keto - 17(20) - [cis] - pregnen - 21-oic acid methyl ester.

7. A compound of the formula:

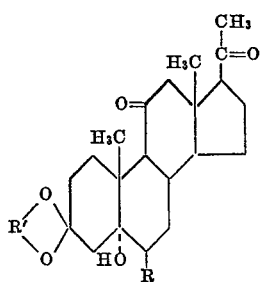

wherein R is selected from the group consisting of fluorine and lower-alkyl and R' is lower-alkylene containing from 2 to 3 carbon atoms in the chain.

8. 3 - (2',2' - dimethyl - trimethylenedioxy - 5α - hydroxy-6β-methylpregnane-11,20-dione.

9. 3-ethylenedioxy-5α-hydroxy-6β-methylpregnane-11,20-dione.

10. A compound of the formula:

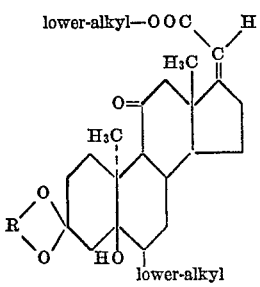

wherein R is lower-alkylene containing from 2 to 3 carbon atoms in the chain.

11. 3 - (2',2' - dimethyl - trimethylenedioxy) - 5α - hydroxy - 6β - methyl - 11 - keto - 17(20) - [cis] - pregnen-21-oic acid methyl ester.

12. 3 - ethylenedioxy - 5α - hydroxy - 6β - methyl - 11-keto-17(20)-[cis]-pregnen-21-oic acid methyl ester.

13. A compound of the formula:

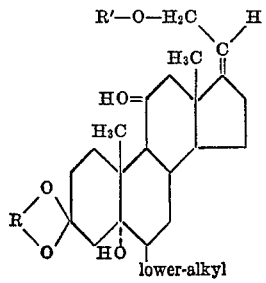

wherein R is lower-alkylene containing from 2 to 3 carbon atoms in the chain and R' is selected from the group consisting of hydrogen and the acyl radical of a hydrocarbon carboxylic acid containing from 1 to 12 carbon atoms, inclusive.

14. 3 - (2',2' - dimethyl - trimethylenedioxy) - 5α,11β, 21-trihydroxy-6β-methyl-17(20)-[cis]-pregnene.

15. 3 - ethylenedioxy - 5α,11β,21 - trihydroxy - 6β-methyl-17(20)-[cis]-pregnene.

16. 3 - (2',2' - dimethyl - trimethylenedioxy) - 5α,11β, 21 - trihydroxy - 6β - methyl - 17(20) - [cis] - pregnene 21-acetate.

17. 3 - ethylenedioxy - 5α,11β,21 - trihydroxy - 6β-methyl-17(20)-[cis]-pregnene 21-acetate.

18. A compound of the formula:

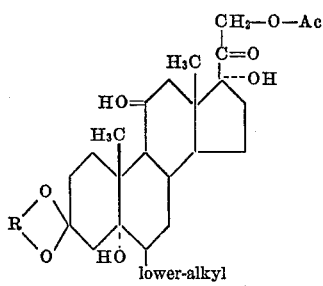

wherein R is lower-alkylene containing from 2 to 3 carbon atoms in the chain and Ac is the acyl radical of a hydrocarbon carboxylic acid containing from 1 to 12 carbon atoms, inclusive.

19. 3 - (2',2' - dimethyl - trimethylenedioxy) - 5α,11β, 17α,21-tetrahydroxy-6β-methylpregnan-20-one 21-acetate.

20. 3 - ethylenedioxy - 5α,11β,17α,21 - tetrahydroxy-6β-methylpregnan-20-one 21-acetate.

References Cited in the file of this patent

UNITED STATES PATENTS

| | | |
|---|---|---|
| 2,707,184 | Hogg et al. | Apr. 26, 1955 |
| 2,752,366 | Hogg et al. | June 26, 1956 |
| 2,838,497 | Spero et al. | June 10, 1958 |
| 2,838,501 | Campbell et al. | June 10, 1958 |
| 2,862,011 | Hogg et al. | Nov. 25, 1958 |

OTHER REFERENCES

Hogg et al.: Chem. & Ind., 1958, pages 1002–03.

UNITED STATES PATENT OFFICE
Certificate of Correction

November 15, 1960

Patent No. 2,960,502    Frank H. Lincoln et al.

It is hereby certified that error appears in the above numbered patent requiring correction and that the said Letters Patent should read as corrected below.

Column 4, line 45, for "lower-alky" read —lower-alkyl—; the lower left-hand portion, Formula X, should read as shown below instead of as in the patent:

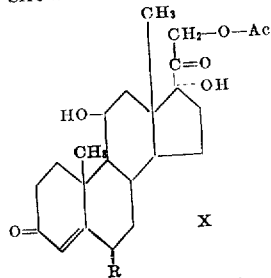

column 5, line 11, for "inclusive (VIII)," read —inclusive, (VIII)—; column 7, line 8, for "m nute" read —minute—; lines 24 and 25, for "21-oic methyl ester" read —21-oic acid methyl ester—; line 34, for "trimetylenedioxy" read —trimethylenedioxy—; column 8, lines 44 and 45, for "alkaools" read —alkanols—; lines 68 and 69, for "trimethylenedioxy" read —trimethylenedioxy)—; column 9, line 5, for "6α-fluoro" read —6β-fluoro—; line 35, for "21-acrylates" read —21-acylates—; column 11, lines 21 and 22, for "6α-methyl-11β,17α,21-trihydroxy-4-pregnene-3,20-dione 21-acetate" read —6α-methyl-11β,17α,21-trihydroxy-4-pregnene-3,20-dione 21-acetate—; line 42, for "isopropl" read —isopropyl—; column 13, lines 22 to 33, the formula should read as shown below instead of as in the patent:

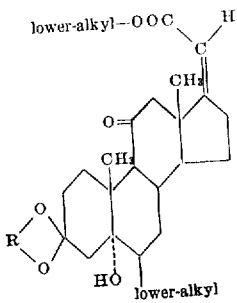

column 13, lines 42–53, the formula should read as shown below instead of as in the patent:

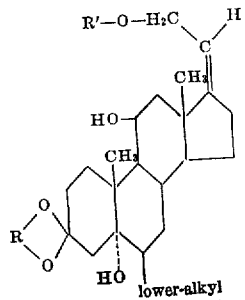

column 14, lines 19 to 29, the formula should read as shown below instead of as in the patent:

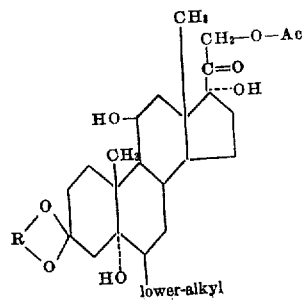

2,960,502

Signed and sealed this 20th day of June 1961.

[SEAL]

Attest:
ERNEST W. SWIDER,
*Attesting Officer.*

DAVID L. LADD,
*Commissioner of Patents.*